US010362136B2

(12) United States Patent
Tankha

(10) Patent No.: US 10,362,136 B2
(45) Date of Patent: Jul. 23, 2019

(54) DEVICE PROFILE DATA USAGE FOR STATE MANAGEMENT IN MOBILE DEVICE AUTHENTICATION

(71) Applicant: Visa International Service Association, San Francisco, CA (US)

(72) Inventor: Gautam Tankha, Union City, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 138 days.

(21) Appl. No.: 14/830,562

(22) Filed: Aug. 19, 2015

(65) Prior Publication Data

US 2016/0057248 A1 Feb. 25, 2016

Related U.S. Application Data

(60) Provisional application No. 62/039,862, filed on Aug. 20, 2014.

(51) Int. Cl.
| | |
|---|---|
| *H04L 29/08* | (2006.01) |
| *G06Q 20/32* | (2012.01) |
| *H04W 12/08* | (2009.01) |
| *G06Q 20/38* | (2012.01) |
| *G06F 21/31* | (2013.01) |
| *H04L 29/06* | (2006.01) |

(52) U.S. Cl.
CPC .......... *H04L 67/306* (2013.01); *G06Q 20/32* (2013.01); *G06Q 20/382* (2013.01); *H04L 67/303* (2013.01); *H04W 12/08* (2013.01); *G06F 21/316* (2013.01); *H04L 63/102* (2013.01)

(58) Field of Classification Search
CPC .... G06F 11/3672; G06F 21/30; G06F 21/316; H04L 9/32
USPC ............................................................ 726/6
See application file for complete search history.

(56) References Cited

U.S. PATENT DOCUMENTS

| | | | | |
|---|---|---|---|---|
| 6,542,515 | B1 * | 4/2003 | Kumar | H04L 67/303 370/463 |
| 7,174,454 | B2 * | 2/2007 | Roskind | G06F 21/316 705/66 |
| 8,494,485 | B1 * | 7/2013 | Broch | H04L 9/3263 455/410 |
| 2004/0186897 | A1 * | 9/2004 | Knauerhase | H04L 67/16 709/209 |
| 2010/0002879 | A1 * | 1/2010 | Risley | H04L 63/0428 380/255 |

(Continued)

*Primary Examiner* — Bryan F Wright
(74) *Attorney, Agent, or Firm* — Kilpatrick Townsend & Stockton LLP

(57) ABSTRACT

Embodiments create and manage a device profile on a mobile device for continued authentication of the mobile device. The device profile includes a state assigned to a mobile device. The state of the device can be managed through the device profile. The mobile device is allowed to conduct payments based on the current state assigned to the mobile device. In response to a request to conduct a payment transaction using the mobile device, the state information in the mobile device profile is checked. The payment transaction using the mobile device is allowed when the state information indicates a trusted state. The payment transaction using the mobile device is limited when the state information indicates a suspended state. The payment transaction using the mobile device is prevented when the state information indicates an untrusted state.

21 Claims, 8 Drawing Sheets

(56) References Cited

U.S. PATENT DOCUMENTS

| | | | |
|---|---|---|---|
| 2010/0100939 A1* | 4/2010 | Mahaffey | G06F 21/30 726/4 |
| 2010/0281262 A1* | 11/2010 | Cheng | G06F 21/10 713/171 |
| 2011/0060947 A1* | 3/2011 | Song | G06F 21/53 714/37 |
| 2011/0167059 A1* | 7/2011 | Fallah | G06Q 30/08 707/723 |
| 2011/0252240 A1* | 10/2011 | Freedman | H04L 63/02 713/169 |
| 2011/0302630 A1 | 12/2011 | Nair | |
| 2012/0054847 A1* | 3/2012 | Schultz | G06F 21/33 726/9 |
| 2012/0198279 A1* | 8/2012 | Schroeder | G06F 11/3672 714/32 |
| 2012/0233665 A1* | 9/2012 | Ranganathan | G06F 21/33 726/4 |
| 2013/0212654 A1 | 8/2013 | Dorfman | |
| 2014/0164475 A1* | 6/2014 | Gargiulo | H04L 9/32 709/202 |
| 2014/0172706 A1* | 6/2014 | Condry | G06Q 30/00 705/44 |
| 2014/0173738 A1* | 6/2014 | Condry | G06F 21/568 726/25 |
| 2014/0289820 A1 | 9/2014 | Lindemann | |
| 2014/0309862 A1* | 10/2014 | Ricci | G01C 21/00 701/36 |
| 2014/0373104 A1 | 12/2014 | Gaddam | |
| 2015/0046989 A1* | 2/2015 | Oberheide | G06F 21/44 726/6 |
| 2015/0177939 A1* | 6/2015 | Anderson | G06F 21/35 715/745 |
| 2015/0324880 A1* | 11/2015 | Huang | G06Q 20/204 705/26.35 |
| 2015/0365827 A1* | 12/2015 | Badenhorst | H04W 12/06 455/411 |

* cited by examiner

500

```
┌─────────────────────────────────────────────────────────────┐
│ CREATE DYNAMIC DEVICE PROFILE INCLUDING STATE INFORMATION FOR A USER │
│ DEVICE, WHEREIN THE STATE INFORMATION INDICATES WHETHER THE USER     │
│ DEVICE HAS A TRUSTED STATE, A SUSPENDED STATE OR AN UNTRUSTED STATE  │
│                              502                                     │
└─────────────────────────────────────────────────────────────┘
                              ↓
┌─────────────────────────────────────────────────────────────┐
│         DETERMINE THAT THE USER DEVICE IS IN THE TRUSTED STATE       │
│                              504                                     │
└─────────────────────────────────────────────────────────────┘
                              ↓
┌─────────────────────────────────────────────────────────────┐
│     PERFORM A LIST OF ACTIONS ONE BY ONE, WHEREIN A SUBSEQUENT       │
│      ACTION ON THE FIRST LIST IS PERFORMED IF A CURRENT ACTION IS    │
│                           COMPLETED                                  │
│                              506                                     │
└─────────────────────────────────────────────────────────────┘
                              ↓
┌─────────────────────────────────────────────────────────────┐
│       TRANSITION THE USER DEVICE TO THE SUSPENDED STATE IF A FIRST   │
│              SET OF ACTIONS OF THE LIST IS COMPLETED                 │
│                              508                                     │
└─────────────────────────────────────────────────────────────┘
                              ↓
┌─────────────────────────────────────────────────────────────┐
│      TRANSITION THE USER DEVICE TO THE UNTRUSTED STATE IF A SECOND   │
│              SET OF ACTIONS OF THE LIST IS COMPLETED                 │
│                              510                                     │
└─────────────────────────────────────────────────────────────┘
                              ↓
┌─────────────────────────────────────────────────────────────┐
│       KEEP THE USER DEVICE TO THE TRUSTED STATE IF A THIRD SET OF    │
│              ACTIONS OF THE LIST IS COMPLETED                        │
│                              512                                     │
└─────────────────────────────────────────────────────────────┘
```

FIG. 5

DEVICE PROFILE DATA USAGE FOR STATE MANAGEMENT IN MOBILE DEVICE AUTHENTICATION

RELATED APPLICATIONS

This application claims the benefit of and priority to U.S. Provisional Application No. 62/039,862, filed Aug. 20, 2014 and entitled "STATE MANAGEMENT FOR MOBILE DEVICE AUTHENTICATION," the entire contents of which are incorporated herein by reference for all purposes.

BACKGROUND

User devices, such as mobile phones, can utilize access data to obtain access to a resource or a location. For example, a mobile phone may include data which is passed to an access device (referred herein as a "transaction") to allow the user of the mobile phone to access a room in a building. In another example, the mobile phone may have access data such as account data which is passed to an access device of a merchant to gain access to an account to perform a transaction.

Traditionally, the security of access data was largely dependent on the capacity of the end product (e.g., card, chip on the mobile phone, etc.) to protect that data. With cloud-based systems or Host Card Emulation (HCE) systems, where the primary access data is not stored on hardware but downloaded onto the user device, authentication of the user device becomes critical for security. For example, the user device may be lost, stolen or otherwise compromised. In such situations, access data associated with the user device may be at risk of being used by fraudsters.

Moreover, requiring user authentication every time the user device is to be used in a transaction is cumbersome and/or a deterrent in consumer's efforts to conduct the transaction using the user device.

Embodiments of the invention are directed to methods and systems of improving data security. Embodiments of the invention address these and other problems, individually and collectively.

BRIEF SUMMARY

Aspects of the disclosure relate to mobile computing device technologies, such as systems, methods, apparatuses, and computer-readable media for managing authentication of a user device (e.g. a mobile device) to be used in transactions. An advantage of device-based authentication is that it can greatly reduce consumer friction during a transaction, because consumer authentication that requires human interaction is preferably minimized.

A series of steps may be required to authenticate a user device for transactions. Depending on the strength of the authentication process, a trust level can be established that can then be used to facilitate different transactions with the user device. For example, a fully trusted device may not require any consumer authentication when used for a transaction, whereas a device with minimal authentication would require additional consumer authentication when used for a transaction.

Techniques described herein allow for creating a dynamic device profile for a user device. The dynamic device profile may include state information associated with a state assigned to the user device. The state of the user device can be managed through the dynamic device profile. According to some embodiments, the user device may have one of three or more states: a trusted state, a suspended state and an untrusted state. When a predetermined set of actions are successfully completed, the user device may transition among the trusted state, the suspended state and the untrusted state. In some embodiments, based on the result of the performed set of actions, the user device may remain in the trusted state or the untrusted state. In some embodiments, the suspended state may be used as a transitory state, i.e. the user device may not remain in the suspended state, and is transferred to the trusted state or the untrusted state based on the result of the performed set of actions.

In some embodiments, the user device may be allowed to conduct transactions (e.g. payment transactions, access transactions) based on the current state of the user device. The user device may be allowed to conduct a transaction without restrictions if the user device is in a trusted state. For example, the user device in the trusted state can be used to conduct a payment transaction or to gain access to a building. Conversely, the user device may be prevented from conducting any transaction if the user device is in an untrusted state. For example, the user device in the untrusted state can be prevented from conducting a transaction such as a payment transaction or an access transaction that includes accessing a building. If the user device is in a suspended state, the user device may be limited in the transactions that can be conducted using the user device. For example, the user device in the suspended state may be used to conduct payment transactions up to a certain limit or at a predetermined location. Alternatively, additional security tests may be performed before allowing the user device in the suspended state to conduct a transaction. For example, the user of the user device in the suspended state may be required to provide additional identifying information before proceeding with the payment transaction. In another example, the user device in the suspended state may be used to gain access only to a predetermined area of a building, or the user of the device may be asked to show proper identification before being granted access to the building.

According to an embodiment, a method is provided. The method includes creating, by a processor, a user profile and a dynamic device profile associated with a user device. The dynamic device profile includes state information for the user device. The method also includes binding, by the processor, the user profile to the dynamic device profile. The binding prepares the user device to conduct one or more transactions. In response to a request to perform a transaction with the user device, the processor checks the state information in the dynamic device profile. The method further includes performing, by the processor, one of the following steps: (i) allowing, by the processor, the transaction with the user device when the state information indicates a trusted state; (ii) limiting, by the processor, the transaction with the user device when the state information indicates a suspended state; or (iii) preventing, by the processor, the transaction with the user device when the state information indicates an untrusted state. The user device transitions among the trusted state, the suspended state and the untrusted state when a predetermined set of actions are completed.

In some embodiments, the method also includes performing one or more security tests on the user device. The predetermined set of actions include the one or more security tests. The method further includes modifying the state information based on the one or more security tests. According to some embodiments, the method may also include unbinding the dynamic device profile from the user profile when the state information indicates the untrusted state.

When the user device is in the untrusted state, the user device remains in the untrusted state when a set of untrusted state actions are completed. The processor may continuously perform the set of untrusted state actions to ensure that the user device qualifies to remain in the untrusted state. In some embodiments, when the user device is in the trusted state, the user device remains in the trusted state when a set of trusted state actions are completed. The processor may continuously perform the set of trusted state actions to ensure that the user device qualifies to remain in the trusted state.

In some embodiments, the method may also include associating a warning flag with the dynamic device profile when the state information indicates the suspended state. In some embodiments, the dynamic device profile further includes one or more of device identification information, a device behavioral history, a risk score associated with the user device, a software configuration of the user device and a hardware configuration of the user device. The predetermined set of actions may include one or more of authentication of user, verification of user device security, identification of user device, creation of the dynamic device profile, binding of the dynamic device profile to the user profile, and management of user device state and the dynamic device profile.

According to an embodiment, a method is provided. The method includes creating, by a processor, a dynamic device profile including state information for a user device, wherein the state information indicates whether the user device has a trusted state, a suspended state or an untrusted state. The method also includes determining that the user device is in the trusted state. The processor performs a list of actions one by one. A subsequent action on the list is performed if a current action is completed. The processor transitions the user device to the suspended state if a first subset of actions of the list is completed. The processor transitions the user device to the untrusted state if a second subset of actions of the list is completed. In some embodiments, the method also includes keeping the user device in the trusted state if a third subset of actions of the list is completed. The list of actions may include one or more of authentication of user, verification of user device security, identification of user device, creation of the dynamic device profile, binding of the dynamic device profile to the user profile, and management of user device state and the dynamic device profile.

Another embodiment is directed to apparatuses, systems, and computer-readable media configured to perform the methods described above.

These and other embodiments are described in further detail below.

BRIEF DESCRIPTION OF THE DRAWINGS

FIG. 5 illustrates another example flow diagram for implementing certain embodiments of the present application.

DETAILED DESCRIPTION

Figure 1A:
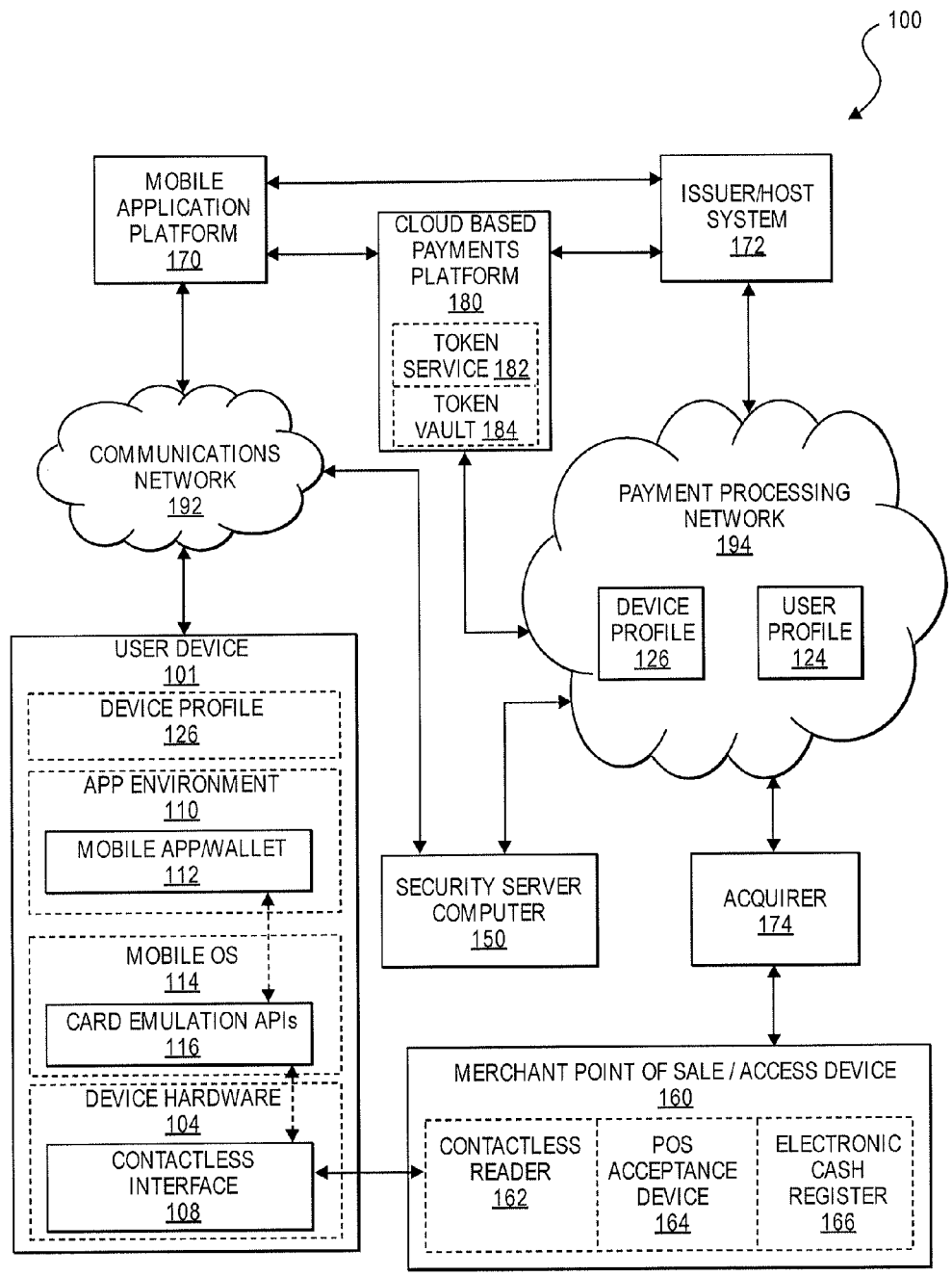
FIG. 1A is an example cloud-based transaction system that may implement various embodiments of the present application.

The following disclosure may provide exemplary systems, apparatuses, and methods for conducting a financial transaction and related activities. Although reference may be made to such financial transactions in the examples provided below, embodiments are not so limited. That is, the systems, apparatuses, and methods described herein may be utilized for any suitable purpose.

Systems, methods, apparatuses, and computer-readable media are described for managing authentication of a user device. For example, techniques described herein allow for creating a dynamic device profile for the user device. The dynamic device profile includes a state assigned to the user device. The state of the user device can be managed through the dynamic device profile. According to various embodiments, the state information may have one of three values: a trusted state, an untrusted state and a suspended state. The user device may dynamically transition among these states when a predetermined set of actions associated with a given state are completed. The user device may be allowed to conduct transactions based on the current state assigned to the user device.

The techniques described herein can utilize card emulation technology (e.g., Host Card Emulation (HCE), etc.) to emulate a smartcard on a communication device (e.g., a portable user device) to allow a mobile application running on the portable communication device to conduct contactless transactions. In the card emulation environment, a mobile application can access the contactless interface (e.g., a near-field communications (NFC) transceiver) of the portable communication device via the operating system (OS) of the portable communication device without involving a secure element. As compared to secure element implementations, the card emulation approach reduces the technical and commercial complexities for issuers and/or payment processors, because issuers and/or payment processors can provision account credentials and payment functionalities to a mobile application on a portable communication device without having to obtain access to a secure element through a mobile network operator.

Prior to discussing embodiments of the invention, description of some terms may be helpful in understanding embodiments of the invention.

As used herein, a "user device" may include any device that has one or more electronic components (e.g., an integrated chip) that can communicate with another device. A "portable communication device" may be a user device that can be transported and operated by a user. A portable communication device may provide remote communication capabilities to a network. The portable communication device can be configured to transmit and receive data or communications to and from other devices. A portable communication device may be in the form of a mobile device such as a mobile phone (e.g., smart phone, cellular phone, etc.), tablets, a mobile vehicle such as a car, portable media player, personal digital assistant devices (PDAs), wearable computing device (e.g., watch), electronic reader device, etc., or in the form of a card (e.g., smart card) or a fob, etc. Examples of portable communication devices may also include portable computing devices (e.g., laptops, netbooks, ultrabooks, etc.).

A "payment device" may include any device that may be used to conduct a financial transaction, such as to provide payment account information to a merchant. A payment device may be in any suitable form. For example, suitable payment devices can be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. Other examples of payment devices include cellular phones, personal digital assistants (PDAs), pagers, payment cards, security cards, access cards, smart media, transponders, 2-D barcodes, an electronic or digital wallet, and the like. If the payment device is in the form of a debit, credit, or smartcard, the payment device may also optionally have features such as magnetic stripes. Such devices can operate in either a contact or contactless mode. According to various embodiments, a mobile device may be used as a payment device.

A "payment account" or an "account" (which may be associated with one or more payment devices) may include to any suitable payment account including a credit card account, a checking account, or a prepaid account.

"Account information" may include any suitable information associated with an account (e.g. a payment account and/or payment device associated with the account). Such information may be directly related to the account or may be derived from information related to the account. Examples of payment account information may include a primary account number (PAN) or "account number", user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment account information may also be used as authentication data.

A "token" may include any identifier for a payment account that is a substitute for other data. A token may include, for instance, a series of alphanumeric characters that may be used as a substitute for an original account identifier. For example, a token may be used in place of a primary account identifier or primary account number (PAN). In some embodiments, a token may be "format preserving"; it may have a numeric format that conforms to the account identifiers used in existing payment processing networks. In some embodiments, the token may comprise the same elements in the same order as a PAN. In other embodiments, the token may be of the same size as a PAN, but may include different elements or differently sized elements. In some embodiments, a token can be used in place of a PAN to initiate, authorize, settle or resolve a payment transaction or represent the original account identifier in other systems where the original account identifier (e.g., a PAN) would typically be used.

In some embodiments, a token value may be generated such that the original PAN or other account identifier associated with the token value may not be computationally derived solely from the token. For example, a token may comprise a randomly generated value associated with an original PAN in a lookup table, so that the token cannot be decrypted, reformatted, or otherwise reverse-engineered to determine the original PAN. Rather, in some embodiments, direct or indirect knowledge of the lookup table may be the only way to determine the original PAN corresponding to the token. In some embodiments, an entity that maintains the aforementioned lookup table may be referred to as a "token vault."

In some embodiments, tokens may be device-specific such that each device associated with an account may be provisioned with a particular token. As such, if a transaction uses a token that is initiated by a different device than the device that the token was provisioned into, the transaction may be fraudulent. Accordingly, device information may be stored in the token vault and used to ensure that the device used in a transaction is associated with the token that is being used in the transaction. Additionally, because each token may be associated with a single device, one PAN or account may have multiple tokens associated with it, where each PAN may have a different token for the different devices that may be used to initiate a transaction associated with the PAN using a specific token. This provides additional security for transactions because network token systems have additional information to validate in order to control the use of sensitive information in a transaction processing system.

The term "transaction" may include an exchange or interaction between two entities. In some embodiments, a transaction may refer to transfer of value between two users (e.g. individuals or entities). A transaction may involve the exchange of monetary funds, the exchange of goods or services for monetary funds, or the exchange of data (e.g. access data) between two parties. In other embodiments, a transaction may involve an individual or entity purchasing goods or services from a merchant or other entity in exchange for monetary funds. In other embodiments, the transaction may be a non-financial-related request, such as exchanging of data or information between two entities, such as the transfer of data.

The term "transaction data" may include information regarding a transaction. The information may include data for a financial transaction (e.g., payment data, transaction total, consumer data). The transaction data may be used for processing a financial transaction. Transaction data may include data for a specific transaction, including items purchased, item prices, total cost, consumer data (e.g., shipping address, email address), payment methods, authentication data, merchant data (e.g., merchant name, merchant location/address), etc. In some embodiments, transaction data may be generated once the user or consumer attempts to submit a transaction for processing. In other embodiments, transaction data may be generated and sent by the merchant system based on items added to a consumer's shopping cart. In some embodiments, transaction data may include information for a non-financial transaction (e.g., alert data, incentive data, product data, etc.). The transaction data may be in any suitable format and may include any suitable information depending on the purpose of the transaction.

Transaction data may be included in a transaction authorization message and/or a transaction clearing and settlement message. In some embodiments, the transaction data may be sent in real-time as a transaction is being performed. In some embodiments, the transaction data may be sent after a transaction has been completed or performed. In some embodiments, the transaction data may be sent to a payment processing network.

An "authorization request message" may be an electronic message that is sent to request authorization for a transaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization. As noted above, in some embodiments, a payment processing network may generate or forward the authorization response message to the merchant.

As used herein, a "server computer" is typically a powerful computer or cluster of computers. For example, the server computer can be a large mainframe, a minicomputer cluster, or a group of servers functioning as a unit. In one example, the server computer may be a database server coupled to a Web server. An example of a server computer is described with reference to FIG. 7.

An "issuer" may typically refer to a business entity (e.g., a bank) that maintains an account for a user that is associated with a portable communication device such as an account enrolled in a mobile application installed on a portable communication device. An issuer may also issue account parameters associated with the account to a portable communication device. An issuer may be associated with a host system that performs some or all of the functions of the issuer on behalf of the issuer.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers.

System Overview

Figure 1B:
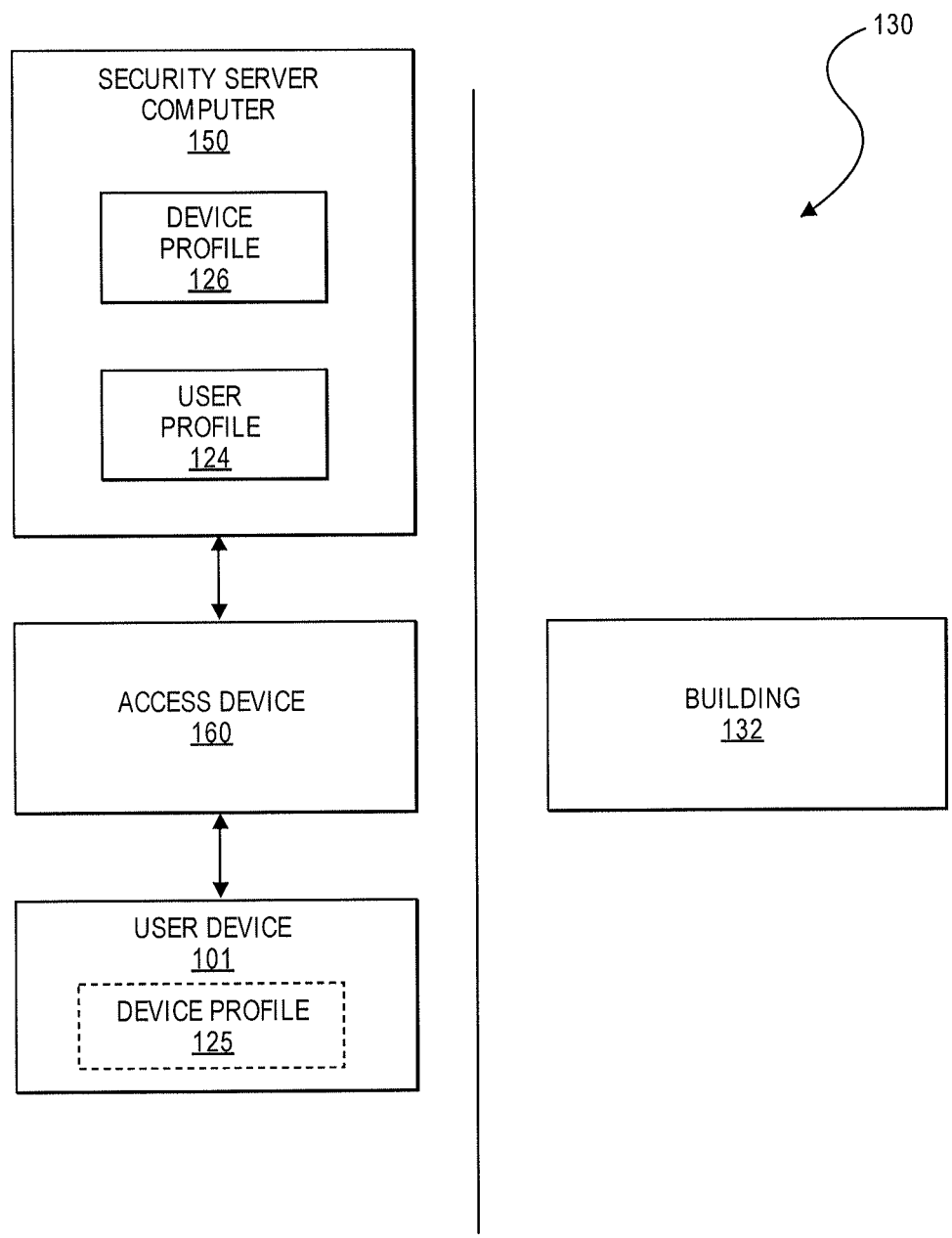
FIG. 1B shows a block diagram of a building access system in accordance with embodiments of the present application.

Embodiments may be implemented using a cloud-based transaction system (as illustrated in FIG. 1A) or a building access system (as illustrated in FIG. 1B). These systems are discussed below in greater detail.

FIG. 1A illustrates an exemplary cloud-based transaction system 100.

The system 100 may include a cloud-based payments platform (CBPP) 180 and a mobile application platform (MAP) 170 to manage cloud-based transactions conducted using user device 101, e.g. a portable communication device. Although MAP 170 is illustrated as a separate logical entity in FIG. 1A because CBPP 180 is not expected to communicate directly with portable communication devices, it should be understood that in some embodiments, some or all of the functionalities of MAP 170 may be integrated as part of CBPP 180. Examples of MAP 170 may include mobile banking platforms and mobile wallet platforms. MAP 170 may communicate with user device 101 via a communications network 192 such as the Internet. CBPP 180 or MAP 170 may be referred to as a remote computer, and may be implemented using one or more computing devices or computers, such as one or more server computers. CBPP 180 may manage cloud-based accounts, provide verification functions for cloud-based transactions, manage lifecycle messages from issuer/host system 172 or MAP 170, as well as initiate lifecycle management events.

CBPP 180 may also implement a set of key management functions that manages issuer master derivation keys (MDKs) from which the limited-use keys (LUKs) for cloud-based transactions are derived. CBPP 180 may implement a set of provisioning functions that manages the preparation and delivery of cloud-based account parameters (e.g., alternate account identifier or token, initial LUK and associated key index, etc.) to MAP 170 for the initial setup of the mobile application 112 on user device 101. CBPP 180 may also manage the cloud-based accounts for processing by issuer/host system 172, and may perform active account management functions such as functions to generate account parameters based on requests or the risk profile of the cloud-based account per CBPP 180 risk management parameters. CBPP 180 may also maintain the account status for each cloud-based account, and manage the replenishment or refreshing of the account parameters.

In some embodiments, CBPP 180 may also implement or be provided with access to a token service 182 and/or a token vault 184. Token service 182 can be used to generate, process, and maintain tokens, which are substitute identifiers for account identifiers. During a transaction, instead of using a real account identifier (e.g., a primary account number (PAN)) to identify the account of the user, a token can be used instead to identify the account. By using a token as a substitute for an account identifier, the risk of comprising real account information can be mitigated. As indicated above, a token may have its own set of use restrictions, and token service 182 may manage the deployment and usage of the tokens according to their use restrictions. Token service 182 may be in communication with token vault 184 where the generated tokens are stored. Specifically, token vault 184 may maintain a mapping between a token and the real account identifier (e.g., PAN) represented by the token.

During transaction processing, token vault 184 may be queried to retrieve the real account identifier or PAN associated with the token.

In cloud-based transactions system 100, user device 101 can be used to conduct cloud-based transactions facilitated by CBPP 180 and/or MAP 170. The user device 101 may also include one or more user interfaces for interacting with other devices. For example, the user device 101 may include a touchscreen that the user may interact with to input data. In some embodiments, user interfaces, such as the touchscreen may also provide entropy for generating random numbers. In addition to including one or more sensors, user device 101 may also include one or more processors, memory units, and/or other hardware components. In one implementation, the user device 101, shown in FIG. 1A may be a mobile communication device implemented using one or more components described in more detail in FIG. 7.

The components in user device 101 may include device hardware 104, a mobile operating system (OS) 114, and an applications environment 110 in which mobile application 112 may reside. Mobile application 112 may be a mobile banking application, a mobile payment application, a mobile wallet application or a merchant's mobile application. Device hardware 104 may include a contactless interface 108 that can interact with a contactless reader 162 of an access device 160. Examples of contactless interface 108 may include one or more radio frequency (RF) transceivers that can send and receive communications using near-field communications (NFC), or other radio frequency or wireless communication protocols such as Bluetooth, Bluetooth low-energy (BLE), Wi-Fi, iBeacon, etc. In some embodiments, contactless interface 108 may include an optical interface (e.g., a display screen) to present payment information in the form of an image such as a quick response (QR) code, or bar code, etc. to contactless reader 162 of access device 160 when contactless reader 162 includes an optical code scanner or reader.

In secure element based implementations, a contactless application (e.g., a mobile wallet or payment application for contactless transactions) using a contactless interface 108 to communicate with a contactless reader of an access device would have to be coded for and be executed on a secure element in order to gain access to the contactless interface. In some embodiments, user device 101 may include a mobile operating system (OS) 114 that implements a set of card emulation application programming interfaces (APIs) 116 such as host card emulation (HCE) APIs to allow mobile application 112 to gain access to contactless interface 108 without requiring the use of a secure element. For example, card emulation APIs 116 may be coded for and be executed from mobile OS 114 of user device 101, and may include programming function calls to allow mobile application 112 to receive, process, and respond to transaction communications such as Application Protocol Data Unit (APDU) commands sent from contactless reader 162. In this manner, user device 101 is able to conduct contactless transactions without requiring access to a secure element on user device 101.

The cloud-based transaction system 100 may also include a security server computer 150. The security server computer 150 may be in communication with the payment processing network 194. In some embodiments, the security server computer 150 may be incorporated in the payment processing network 194. The security server computer 50 may generate a user profile 124 associated with the user and a dynamic device profile 126 associated with the user device 101 of the user. The user profile 124 and the dynamic device profile 126 may be stored at the payment processing network 194. In some embodiments, the user profile 124 and the dynamic device profile 126 may be stored at a location accessible by the security server computer 150. In some embodiments, the dynamic device profile 126 or a copy of the dynamic device profile may be stored on the user device 101. The security server computer 150 may bind the user profile 124 with the dynamic device profile 126 to prepare the user device 101 for being used in transactions.

The dynamic device profile 126 may store device state information. The user device 101 may have one of three states: a trusted state, an untrusted state and a suspended state. The user device 101 may transition among these states when a predetermined set of actions for each transition is successfully completed. A transaction initiated using the user device 101 may be allowed, limited (i.e. restricted) or prevented (i.e. denied) based on the state of the user device 101 stored in the dynamic device profile 126. The security server computer 150 may continuously monitor the dynamic device profile 126, the user profile 124 and/or the user device 101 to ensure that the state information associated with the user device 101 is accurate and current.

According to various embodiments, a single consumer (i.e. user) may have multiple user devices, and thus may be associated with multiple device profiles. A device profile is different from a user profile. The user profile is independent of any device (e.g. the user device, the access device, the security server computer, etc.) and can be maintained in all states of the device profile. For example, the user profile may capture the user's payment behavior independent of the user device.

To conduct a cloud-based transaction, a user may place user device 101 in proximity of the contactless reader 162 of access device 160, or display an image such as a QR code or bar code on a screen of user device 101 for scanning by contactless reader 162 of access device 160. User device 101 may provide access device 160 with an identifier (e.g., an account identifier such as a PAN, an alternate account identifier such as an alternate PAN, or a token, etc.) to identify the account of the user and additional information such as the limited-use account parameters or information derived from the limited-use account parameters (e.g., transaction cryptograms generated from an LUK). In some embodiments, the additional information may include a device identifier and/or the state information of the user device. If the additional information does not include the state information, the security computer server 150 or the payment processing network 194 may locate the device profile 126 containing the state information for the user device 101 using the device identifier or the PAN.

For example, in some embodiments, an account identifier or token, and additional information (e.g., a transaction cryptogram, account parameters, etc.) can be transmitted to access device 160 in APDU responses that are responsive to a series of APDU commands received from access device 160. In some embodiments, an account identifier or token, and the additional information can be encoded in a QR code or bar code that is scanned and processed by access device 160 to retrieve the encoded information. Access device 160 or a merchant computer coupled to access device 160 may then generate an authorization request message including the account identifier or token, and additional information such as a transaction cryptogram and other transaction data, and forward the authorization request message to acquirer 174 associated with the merchant. The authorization request message can then be sent by acquirer 174 to payment processing network 194.

Payment processing network 194 may include data processing subsystems, networks, and operations used to support and deliver authorization services, exception file services, transaction scoring services, and clearing and settlement services. An exemplary payment processing network may include VisaNet™. Payment processing networks such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

Upon receiving the authorization request message, the payment processing network 194 may determine (or may communicate with the security server computer 150 to determine) the state of the user device 101. If the user device 101 is in an untrusted state, the payment processing network 194 may deny the transaction request. If the user device 101 is in a suspended state, the payment processing network 194 may limit the transaction. For example, the transaction may be limited in terms of the transaction amount or transaction location. In some embodiments, limiting the transaction may entail requesting additional authentication from the user, such as asking for additional passcodes or security question answers. If the user device 101 is in a trusted state (or if the user provides the additional authentication in the suspended state), the payment processing network 194 may forward the authorization request message received from acquirer 174 to the corresponding issuer/host system 172 of the account of the user of user device 101.

After issuer/host system 172 receives the authorization request message, the authorization request message may be parsed, and the information in the authorization request message may be verified. For example, issuer/host system 172 may verify that the transaction cryptogram was generated by a valid LUK, and that the set of one or more limited-use thresholds associated with the LUK has not been exceeded. In some embodiments, some or all of the information in the authorization request message can also be sent to CBPP 180 for verification and processing. For example, if issuer/host system 172 does not have the capability to verify the transaction cryptogram, the payment processing network 194 or issuer/host system 172 may forward the transaction cryptogram to CBPP 180 for verification.

An authorization response message is then sent back to payment processing network 194 to indicate whether the current transaction is authorized (or not authorized). Payment processing network 194 then forwards the authorization response message back to acquirer 174. In some embodiments, payment processing network 194 may decline the transaction even if issuer/host system 172 has authorized the transaction, for example, depending on a value of a fraud risk score or depending if limited-use account parameters are verified by CBPP 180. Acquirer 174 then sends the authorization response message to the merchant computer and/or access device 160. The authorization response results, which may include transaction data for the transaction can be displayed by access device 160, or be printed out on a physical receipt.

At the end of the day, a clearing and settlement process can be conducted by payment processing network 194. A clearing process is a process of exchanging financial details between an acquirer and an issuer to facilitate posting to a user's payment account and reconciliation of the user's settlement position. It should be understood that any of the acquirer 174, payment processing network 194, issuer/host system 172, CBPP 180, and/or MAP 170 may be referred to as a remote computer, and may include one or more computing devices such as one or more computers or server computers to enable the entity to communicate with the other entities in system 100, and/or to perform one or more of the functions described herein.

Embodiments of the invention are not limited to payment transactions. In some embodiments, the state information on the user device may be used to obtain access to a resource or a location. For example, the user device may include data which is passed to an access device to allow the user to access a building or a room in the building. For example, a building operator system may provision the user device with data that allows the user to access the building. Once the user device is provisioned with access data, it may be used to conduct an access transaction. When the user presents the user device to an access reader of the building, access may be granted to the user based upon the state information of the user device.

FIG. 1B illustrates a system including a user device that is provisioned with access data and that can allow a user to access a location such as a building.

FIG. 1B illustrates an exemplary building access system 130.

Similar to FIG. 1A, FIG. 1B includes a security server computer 150. The security server computer may generate a user profile 124 associated with the user of the user device 101 and a dynamic device profile 126 associated with the user device 101. The user profile 124 and the dynamic device profile 126 may be stored at the security server computer 150 or at a location accessible by the security server computer 150. In some embodiments, the dynamic device profile 126 or a copy of the device profile may be stored on the user device 101. The security server computer 150 may bind the user profile 124 with the dynamic device profile 126 to prepare the user device 101 for being used in transactions.

The dynamic device profile 126 may store device state information. The user device 101 may have one of three states: a trusted state, an untrusted state and a suspended state. The user device 101 may transition among these states when a predetermined set of actions for each transition is successfully completed. The security server computer 150 may continuously monitor the dynamic device profile 126, the user profile 124 and/or the user device 101 to ensure that the state information associated with the user device 101 is accurate and current.

According to various embodiments, the user device 101 illustrated in FIG. 1B may have been provisioned with access data. The user device 101 may interact with the access device 160 and pass access data to the access device 160. The access device 160 may interact with the security server computer 150 to verify the received access data. The security server computer 150 may determine the current state of the user device 101 upon the user device 101 providing the access data to the access device 160. For example, the state information of the user device 101 may be provided by the user device 101 to the access device 160. Alternatively, the user device 101 may provide a device identifier that the security server computer 150 can use to locate the device profile 126.

The state information may indicate the current state of the user device 101. If the user device 101 is in the trusted state, the security server computer 150 may transmit a signal to the access device 160 to grant access to the building 132. The access device 160 may then proceed to let the user enter the building 132. If the user device 101 is in the untrusted state, the security server computer 150 may transmit a signal to the access device 160 to prevent the user from entering the building 132. If the user device 101 is in the suspended state, the security server computer 150 may transmit a signal to the access device 160 to request additional information from the user, e.g. showing of additional identification, or to grant restricted access only to certain parts of the building 132.

Security Server Computer

Figure 2:
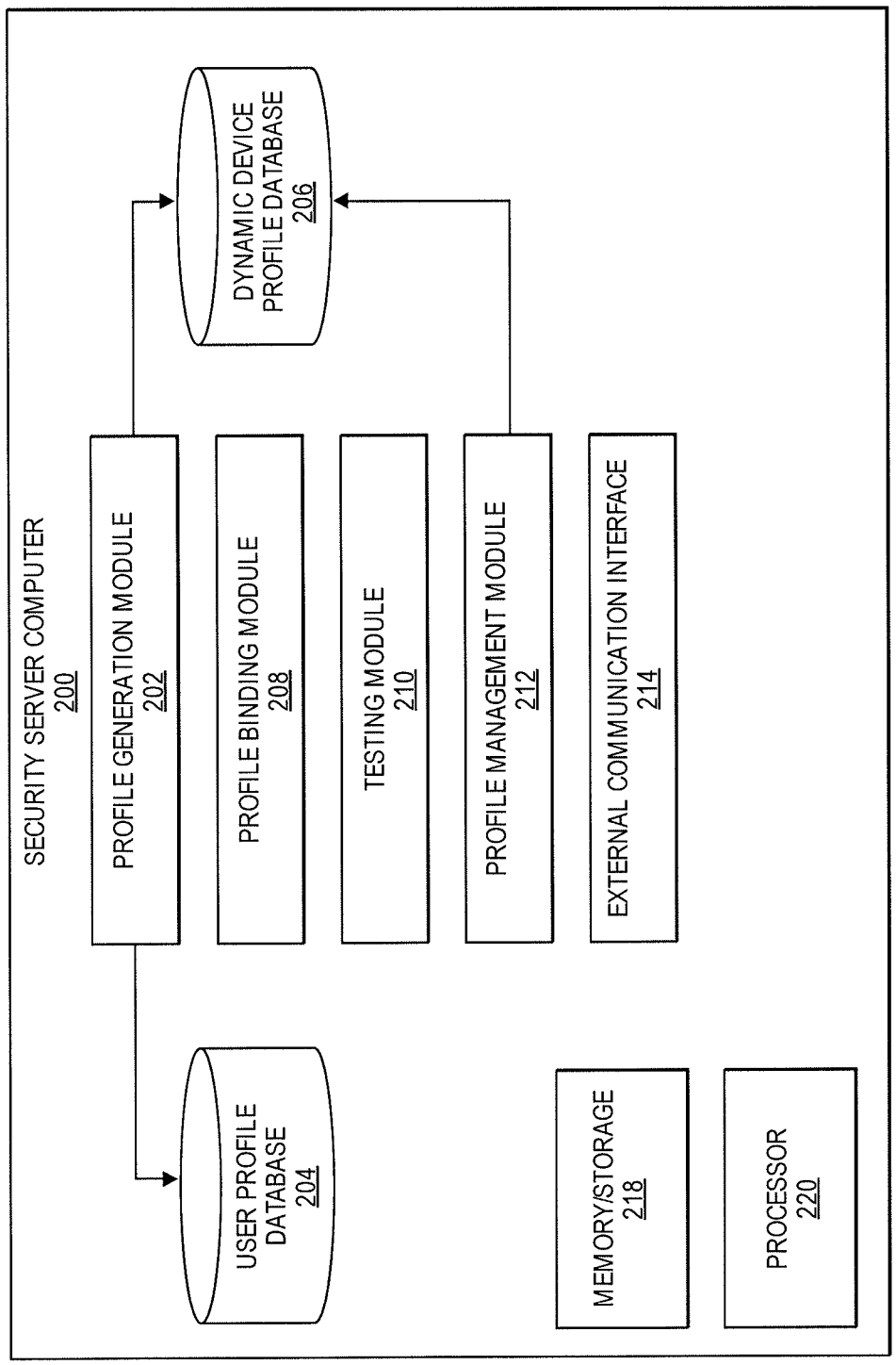
FIG. 2 illustrates components of an exemplary security server computer in accordance with embodiments of the present application.

As provided above, before allowing a user device to be used for transactions (e.g. financial transactions, access transactions), the user device and the user may be authenticated by, for example, the security server computer and/or the payment processing network. FIG. 2 illustrates the components of an exemplary security server computer 200.

First, the user (e.g. the consumer) may authenticate themselves to the security server computer 200 and/or the payment processing network in communication with the security server computer 200. The user device may not be allowed to proceed further if the consumer authentication fails. Upon authentication of the user (i.e. once the consumer's identity has been confirmed), profile generation module 202 of the security server computer 200 may, in conjunction with a processor 220, generate a user profile. The user profile may be stored at a user profile database 204. The user profile database 204 may be stored at the security server computer 200 (as illustrated in FIG. 2) or at a remote location accessible by the security server computer 200. The user profile may include user preferences, behavioral patterns, spending patterns and other information associated with the user. The user profile may be independent of any device, such as the user device, the payment processing network, a point of sale (POS) terminal of a merchant, the security server computer, etc.

After authenticating the user, the security of the user device may be verified by performing one or more device security tests. For example, testing module 210 of the security server computer 200 may perform device security tests to ensure that one or more of the following criteria is met: the operating system (OS) running on the user device has all security patches installed, a mechanism is in place to actively detect and intercept virus and malware, the OS is not jail-broken or rooted, and the OS is not operating in debug mode. In some embodiments, the user device may not be allowed to be used in transactions if one or more of the above criteria is not met. In other embodiments, different weights may be assigned to the above criteria. The testing module 210 may determine a total score for the user device when one or more of the above criteria is met. The user device may be allowed to be used in transactions if the total score of the user device is above a predetermined threshold.

Once the security of the user device is verified, the identity of the user device may be established by the security server computer 200. The identification data provided by the user device 101 to the security server computer 200 for identification may include data elements that can prevent reuse of the data as part of a replay or relay attack. For example, a device fingerprint combined with a server-generated nonce can be encrypted and sent to the user device for future authentication. The nonce and encrypted value may be updated the next time the user device sends the fingerprint for verification. Such an approach can limit the success of a replay attack.

The identification data provided by the user device may include static and dynamic identifiers that uniquely identify the user device. Static identifiers do not change over time while the dynamic identifiers may vary over time for the same user device. In some embodiments, the user device may have pre-determined thresholds for variation of the dynamic identifiers. The static and dynamic identifiers may provide a unique fingerprint for each user device. Exemplary identifiers may include, but are not limited to, International Mobile Subscriber Identity (IMSI) bound to the subscriber identity module (SIM), the phone number assigned to the SIM, the Mobile Subscriber Integrated Services Digital Network-Number (MSISDN) bound to the device, the mobile subscriber number, a globally unique number identifying a physical piece of Code Division Multiple Access (CDMA) mobile equipment identifier (MEID), the International Mobile-Station Equipment Identity (IMEI) number that is generally unique and identifies the mobile equipment, Bluetooth 48-bit address, Wi-Fi Media Access Control (MAC) address, etc.

According to various embodiments, the profile generation module 202 may, in conjunction with a processor 220, also generate a dynamic device profile for the user device. The dynamic device profile may be maintained by the security server computer 200 using a dynamic device profile database 206 on the security server computer 200 (as illustrated in FIG. 2), on the payment processing network, or the user device. The security server computer 200 may request information from the user device such as device identifier, payment account information, user password, etc. to create the device profile. The security server computer 200 may communicate with the user device over communications network through the external communications interface 214 of the security server computer 200.

The dynamic device profile may include the device state, identification information of the user device, behavioral history of the user device, locations where the user device is used, the type of transactions the user device is used for, a risk score assigned to the user device, a software configuration of the user device, a hardware configuration of the user device, and other related information. The dynamic device profile may be updated with time as the consumer uses the user device to conduct transactions. Thus, the dynamic device profile may reflect more accurately the expected behavior of the consumer using the user device for conducting transactions, as more transactions take place with time.

Profile binding module 208 of the security server computer 200 may, in conjunction with a processor 220, bind the dynamic device profile to the user profile. The binding indicates that the user device is controlled by the consumer and can be enabled for transactions. For example, for payment transactions, the binding of the user profile to the dynamic device profile indicates that the user device is ready for payments. The consumer may be able to make payments from the user device.

The binding of the dynamic device profile to the user profile may take place once all the security tests have been conducted by the testing module 210, in conjunction with a processor 220. When the user device passes the security tests, the state of the user device stored in the dynamic device profile can be set as "trusted." The profile state management module 212 of the security server computer 200 may, in conjunction with a processor 220, monitor the state information of the user device.

The security server computer 200 may also include a system memory 218 comprising one or modules to generate and utilize electronic messages, and the data processor 220 for facilitating a financial transaction and the exchange of electronic messages. According to some embodiments, the user profile database 204 and the dynamic device profile database 206 may be stored at the system memory 218.

Management of Device States

According to some embodiments, the device state included in the dynamic device profile may have one of the following values: an untrusted state, a trusted state and a suspended state. In some embodiments, the user device may transmit the state information or an indicator of the state information (such as a code, a flag, etc.) to the access device and then to the payment processing network via the acquirer. For example, the device state may be sent in an authorization request message. Yet in other embodiments, the user device may transmit a device identifier in the authorization request message, which may be used by the security server computer (or the payment processing network) to determine the state of the user device.

The management of the states of the mobile device will be discussed next with reference to FIG. 3.

In the untrusted state 300, the user device may be unidentified, compromised, lost or stolen. In light of an assessment of the security server computer, the payment processing network may prevent the user device from conducting any transactions while the user device is in the untrusted state 300. For example, an authorization request message sent from the user device in the untrusted state 300 may be first received at the security server computer. The security server computer may notify the payment processing network that the user device is in the untrusted state 300. The payment processing network may automatically decline the authorization request message without forwarding the authorization request message to the issuer. In the untrusted state 300, the user device may have been identified as new. In some embodiments, the user device may be identified as being infected with malware. Accordingly, a new device profile may be needed once the OS or the infected application is sufficiently updated so that the user device can transition to the trusted state 302.

In the trusted state 302, the user device may be registered with the security server computer, identified by the security server computer and/or assessed to be trustworthy. The security server computer may notify the payment processing network that the user device is in the trusted state 302. The payment processing network may allow the user device to conduct transactions while the user device is in the trusted state 302.

In the suspended state 304, the user device may be registered with the security server computer and identified the security server computer, but not considered to be trustworthy. The security server computer may notify the payment processing network that the user device is in the suspended state 304. The payment processing network may limit the transactions that can be conducted while the user device is in the suspended state 304. In some embodiments, the user device may be prevented from conducting any transactions while in the suspended state 304. In other embodiments, the user device in the suspended state 304 may only conduct transactions below a predetermined threshold value. For example, the threshold value may include a maximum currency amount per day (for payment transactions), a maximum amount per transaction (for payment transactions), a maximum number of transactions (for payment or access transactions), etc. In yet other embodiments, the user device in the suspended state 304 may be allowed to conduct transactions after the user provides additional authentication data, such as a personal identifying number, passcodes or answers to security questions. If the user device is in the suspended state 304, further security tests (e.g. list of predetermined actions) must be conducted on the user device to determine whether the user device may be transitioned into the trusted state 302 or untrusted state 300.

The security server computer may manage the dynamic device profiles to establish trusted state, suspend device functionality and/or deny authorization (e.g. authorization for payment or access authorization). For example, if suspicious activity is identified on the user profile and/or the dynamic device profile, the user profile and/or the mobile device profile may be updated with a flag. The flag indicates a transition to the suspended state. A successful mobile device security testing may result in removal of the user profile flag and/or the mobile device profile flag. The removal of the flag indicates a transition back to the trusted state. However, if the security testing is unsuccessful, the security server computer may unbind the dynamic device profile from the user profile to establish the lack of trust. The binding may be removed once all the security tests have been conducted by the security server computer. Removal of the binding moves the user device into the untrusted state and effectively stops all access attempted using the user device.

Table 1 illustrates exemplary set of actions that need to be completed for the user device to transition between states.

TABLE 1

| | | | | | |
|---|---|---|---|---|---|
| | | | The user device state and transitions | | |
| STEPS | Setting the user device as Trusted Transition B | Detecting suspicious activity indicating the user device is Suspended Transition D | Further tests in the Suspended state Transition F (all conditions to be satisfied); and Transition G (only 1, 2 or 3 conditions satisfied) | User device is reported as lost or stolen Transition A and Transition C | Keeping the user device as Trusted Transition E |
| 1 | Authentication of user | Verification of user device security | Authentication of user | Management of the user device state and profile | Verification of user device security |
| 2 | Verification of user device security | Identification of user device | Verification of user device security | | Identification of user device |
| 3 | Identification of user device | Management of the user device state and profile | Identification of user device | | Management of the user device state and profile |
| 4 | Creation of the dynamic device profile | | Management of the user device state and profile | | |

TABLE 1-continued

The user device state and transitions

| STEPS | Setting the user device as Trusted Transition B | Detecting suspicious activity indicating the user device is Suspended Transition D | Further tests in the Suspended state Transition F (all conditions to be satisfied); and Transition G (only 1, 2 or 3 conditions satisfied) | User device is reported as lost or stolen Transition A and Transition C | Keeping the user device as Trusted Transition E |
|---|---|---|---|---|---|
| 5 | Binding of user profile to dynamic device profile | | | | |
| 6 | Management of the user device state and profile | | | | |

Figure 3:
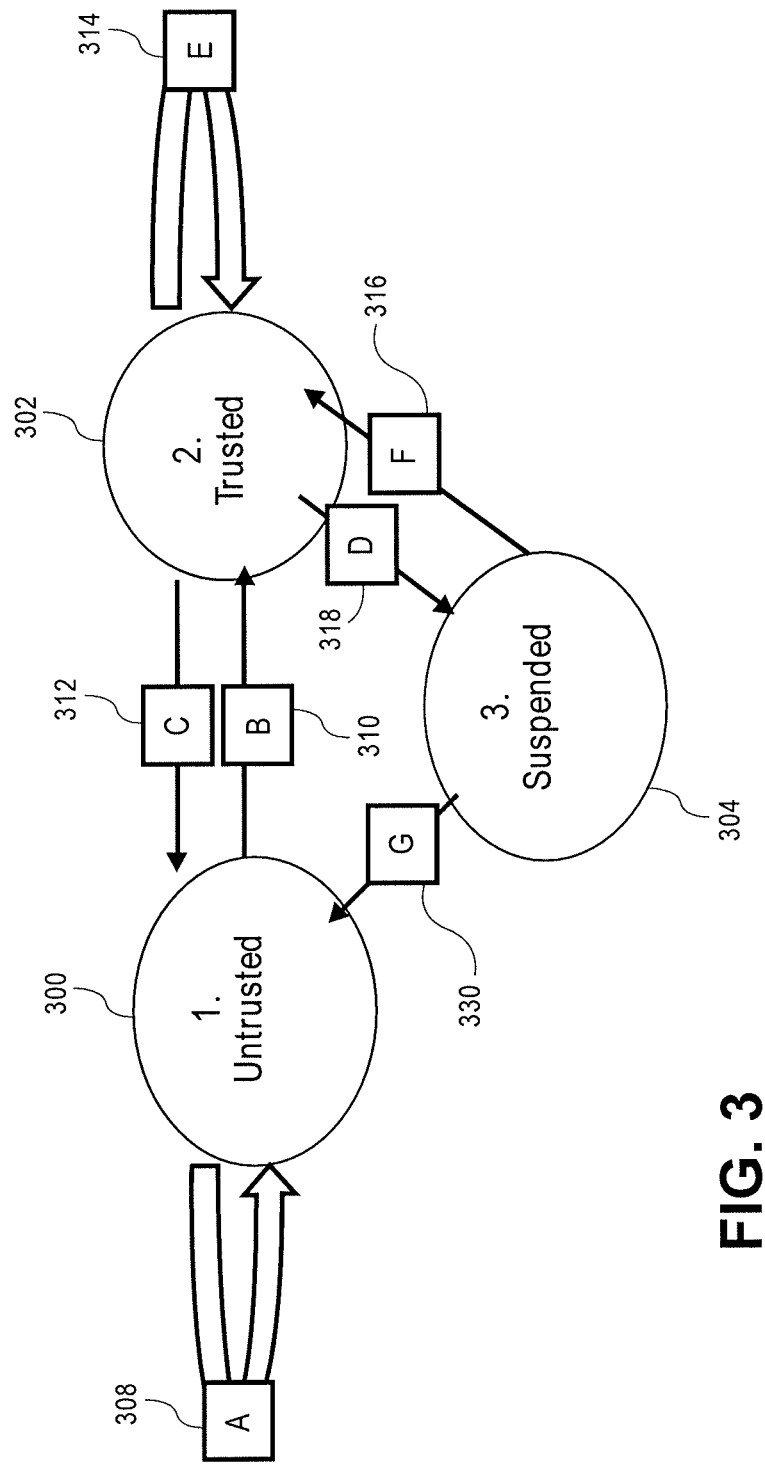
FIG. 3 illustrates states and transitions of a user device in accordance with embodiments of the present application.

As illustrated in FIG. 3, transition A 308 indicates that the user device which was already in an untrusted state 300 remains in the untrusted state 300. Transition A 308 happens when no security tests can be successfully completed (i.e. the security tests generate an unfavorable result). As provided in Table 1, only management of the user device state and profile is performed for transition A 308. Specifically, the user device profile is maintained to indicate that the device remains lost, stolen or compromised and that the state information is to be updated to "untrusted." The security server computer prevents the user device in the untrusted state from conducting any transactions. The security server computer unbinds the dynamic device profile from the user profile to establish the lack of trust now associated with the user device. The user device may transition to the trusted state via transition B 310 upon completing the requirements of transition B 310 discussed next.

Transition B 310 happens when the user device is in the untrusted state 300 and a set of predetermined actions are successfully completed. With transition B, the user device moves from the untrusted state 300 to the trusted state 302. As provided in Table 1, the set of predetermined actions associated with transition B 310 may include authentication of the user, verification of the user device security, identification of user device, creation of the dynamic device profile, binding of the user profile to dynamic device profile and management of the user device state and profile. These actions are described next.

In connection with the "authentication of the user" action, the user may be asked to confirm their intention to register with the payment processing network (through the security server computer). For example, the security server computer may send a Uniform Resource Language (URL) link to the consumer via Short Message System (SMS) or email. The consumer may activate the URL link to confirm their intention to register with the payment processing network. The authentication of the user may also include creating a user profile for the user. In some embodiments, creation of the user profile may only be required for initial registration of the consumer. If the user is already registered (enrolled) with the payment processing network, the authentication of the user action may be performed by asking the user to provide a password. The user profile may include consumer preferences, behavioral patterns, spending patterns and other information. The user profile may be independent of any device.

The "verification of the user device security" action may entail ensuring that the operating system (OS) of the user device has all security patches installed, a mechanism is in place to actively detect and intercept virus and malware on the user device, the OS is not jail-broken or rooted, and the OS is not operating in debug mode.

Using the "identification of the user device" action, the security server computer can able to uniquely identify the user device. The user device may be uniquely identified using a series of static and dynamic identifiers. These identifiers create a unique fingerprint. The static identifiers may not change over time, may be unique for each user device such that no identifier identifies two separate devices, and may be available on all user devices regardless of make or model. The dynamic identifiers may vary over time for the same device within predetermined threshold, and may be available on all user devices regardless of make or model. According to various embodiments, the security server computer may establish acceptable thresholds for the device identifiers based on the risk tolerance of the security server computer or the payment processing network. Moreover, the security server computer may have a system in place to prevent replay or relay attacks. For example, a device fingerprint combined with a server-generated nonce can be encrypted and sent to the user device for future authentication. The nonce and encrypted value may be updated the next time the user device sends the fingerprint for verification. Such an approach can limit the success of a replay attack.

In accordance with the "creation of the dynamic device profile" action, the security server computer may generate a dynamic device profile. The device profile may include the device state information. Since the device state may change as discussed herein, the device profile is dynamic. The dynamic device profile may include, in addition to the state information, identification information, behavioral history of the user device, a risk score assigned to the user device and other related information. The dynamic device profile may reflect the expected behavior of the consumer in using the user device to conduct transactions.

In accordance with the "binding of the user profile to the dynamic device profile", the security server computer may bind the user profile to the dynamic device profile. The binding may happen when all security tests have been conducted and the security server computer determines that the user device can be moved to the trusted state. The binding indicates that the user device is controlled by the consumer and can be enabled to conduct transactions.

The "management of the user device state and profile" entails making sure that the user device is in a correct state.

The security server computer continuously monitors the user device and performs the security tests and/or the predetermined list of actions. The security server computer allows transactions when the user device is in the trusted state, limits transactions when the user device is in the suspended state and prevents transactions when the user device is in the untrusted state.

In some embodiments, the predetermined set of actions may be performed sequentially when a previous action is successfully completed. For example, for transition B 310, the verification of the user device security is performed only when the authentication of the user is successfully completed. Similarly, the management of the user device state and profile is performed when all actions listed previously are completed successfully. If any of the predetermined actions fail, transition B is not performed, i.e. the user device remains in the untrusted state 300.

In other embodiments, the predetermined steps may be performed randomly and it may be possible to transition the user device from the untrusted state 300 to the trusted state 302 even when all the predetermined actions may not be completed. For example, various weights may be assigned to the actions. The security server computer may determine a total score for the user device based on the successfully completed actions among the set of predetermined actions. The transition B may be allowed if the total score of the user device is above a predetermined threshold.

Transition C 312 happens when the user device is in the trusted state 302 and the user device is lost, stolen or compromised (e.g. infected with malware). With transition C, the user device moves from the trusted state 302 to the untrusted state 300. As provided in Table 1, the user device can move to the untrusted state 300 via transition C when management of the user device state and profile is performed. Specifically, the user device profile is updated to indicate that the device is lost, stolen or compromised and that the state information is to be updated to "untrusted." The security server computer prevents the user device in the untrusted state from conducting any transactions. The security server computer unbinds the dynamic device profile from the user profile to establish the lack of trust now associated with the user device. The user device may transition to the trusted state via transition B 310 upon completing the requirements of transition B 310 discussed above.

Transition E 314 happens when the user device is in the trusted state 302 and, as a result of the performed predetermined set of actions, remains in the trusted state 302. The set of predetermined actions associated with transition E 314 may include verification of the user device security, identification of user device, and management of the user device state and profile.

Transition D 318 happens when the user device is in the trusted state 302 and, as a result of the occurrence of a predetermined event and the performed predetermined set of actions, transitions to the suspended state 304. The predetermined event may be that a suspicious circumstance is present or inferred from the current or past transaction, but the circumstance is not so suspicious that the user device is transitioned to the untrusted state 300. For example, a user may use the user device for a transaction in a city where he has never conducted a transaction, but that is only 50 miles from a location where he might normally use the user device. It is possible that the user may have traveled to that city for the first time since it is relatively close to where the user might conduct a transaction. However, the transaction is not as trusted as a transaction conducted in a place where the user normally conducts transactions. If this predetermined event occurs, and the set of predetermined actions associated with transition D 318 including, for example, verification of the user device security, identification of user device, and management of the user device state and profile are performed, then the mobile device may be transitioned to the suspended state 304, rather than the untrusted state 300. The security server may set an "Action Required" flag on the dynamic device profile when the dynamic device profile indicates that the device is in the suspended state 304. As provided above, the security server computer may allow limited transactions when the state information indicates the suspended state 304. This is advantageous, since the ability to use the user device to conduct a transaction is modified or limited based upon the possible risk of fraud.

According to various embodiments, the suspended state 304 may be used as a transitory state, i.e. the user device may not remain in the suspended state 304, and is transferred to the trusted state 302 or the untrusted state 300 based on the result of the performed set of actions. Table 1 illustrates the set of actions that may be performed on the user device when the user device is in the suspended state 304. If all of the predetermined actions are successfully completed, the user device transitions to the trusted state 302 via Transition F 316 (discussed next). If, only a subset of the actions are completed, the user device transitions to the untrusted state 300 via Transition G (discussed below).

Transition F 316 happens when the user device is in the suspended state 304 and, as a result of the performed predetermined set of actions, transitions to the trusted state 302. Along with the transition F 318, the security server computer removes the "Action Required" flag from the dynamic device profile. That is, the security server computer may update the state information of the mobile device from "suspended" to "trusted." The set of predetermined actions associated with transition F 316 may include authentication of the user, verification of the user device security, identification of user device, and management of the user device state and profile. That is, in addition to the actions required for transition D 318, the authentication of the user is required for transition F 316. Upon authenticating the user, the security server computer may allow transactions when the user device transitions to trusted state 302 with transition F 316.

Transition G 320 happens when the user device is in the suspended state 304 and, transitions to the G 320 when even one of the following actions cannot be satisfied: authentication of the user, verification of the user device security, identification of user device, or management of the user device state and profile. That is, when the user device is in the suspended state 304, if the user cannot be authenticated, the user device security cannot be verified, or the user device cannot be identified by the security server computer, the user device may transition to the untrusted state 300 via transition G 320. When the user device transitions to the untrusted state 300, the user device is prevented from conducting any transactions.

Figure 4:
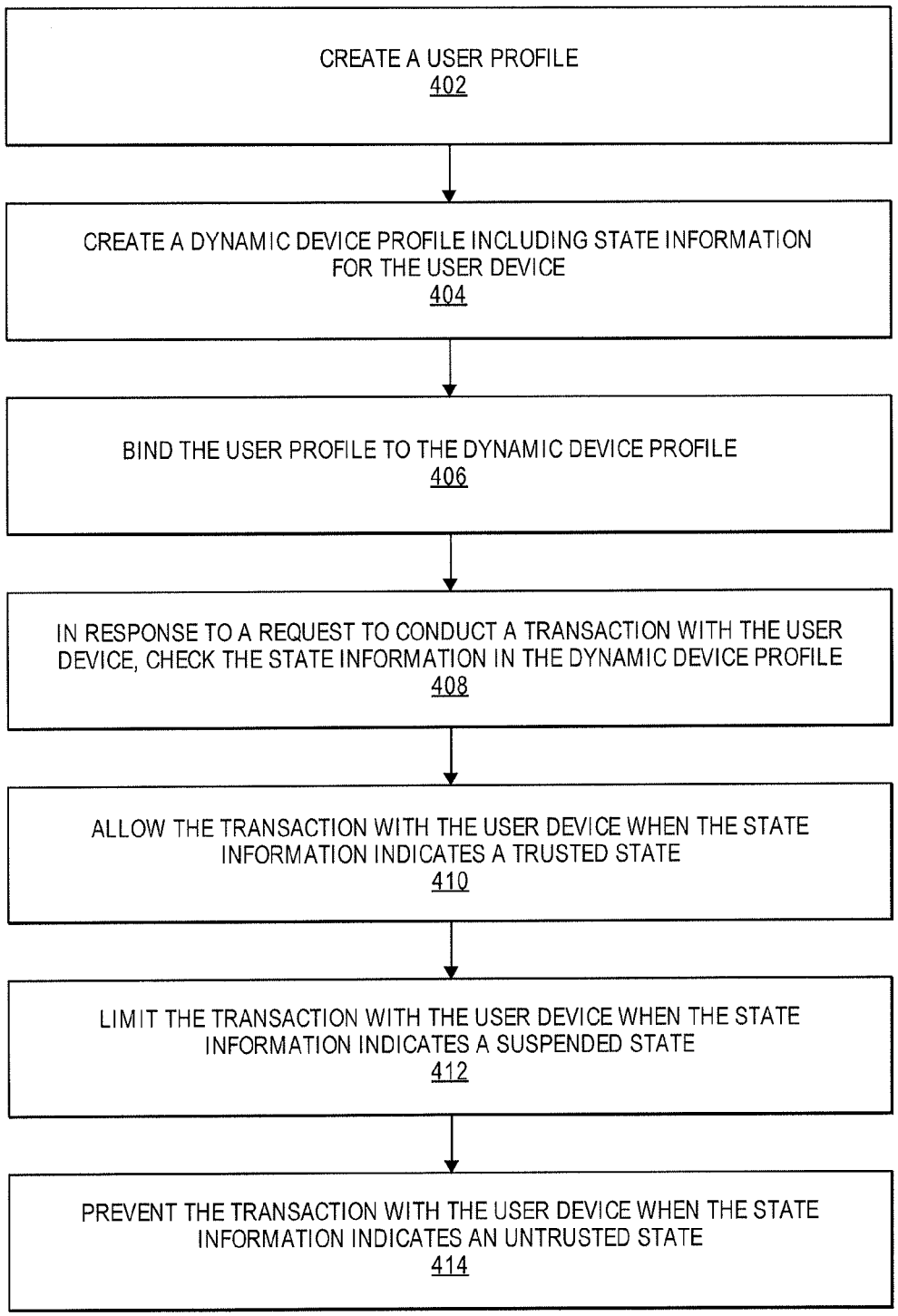
FIG. 4 illustrates an example flow diagram for implementing certain embodiments of the present application.

FIG. 4 illustrates an example flow diagram 400 for creating and managing a dynamic device profile according to an exemplary embodiment.

At step 402, a user profile may be created by a security server computer. The user profile may be stored at a user profile database accessible by the security server computer. The user profile may include user preferences, behavioral patterns, spending patterns and other information associated with the user. The user profile may be independent of any device, such as the user device, the payment processing network, a point of sale (POS) terminal of a merchant, the security server computer, etc.

At step 404, a dynamic device profile may be created by the security server. The dynamic device profile may include device state information, identification information of the user device, behavioral history of the user device, a risk score assigned to the user device and other related information. The dynamic device profile may be updated with time as the consumer uses the user device to conduct transactions. Thus, the dynamic profile may reflect more accurately the expected behavior of the consumer using the user device for conducting transactions as more transactions take place with time. The device state information may indicate a trusted state, a suspended state and an untrusted state for the user device. The dynamic device profile may be maintained on the user device or a dynamic device profile database accessible by the security server computer when the device state information indicates the trusted state or the suspended state. When the device state information indicates the untrusted state, the dynamic device profile may be deleted and re-created upon the user device passing one or more security tests or when the user device is determined to conform with a pre-determined security criteria.

At step 406, the security server computer may bind the user profile to the dynamic device profile. The security server computer may continuously monitor the state information associated with the user device and perform security tests to ensure that the user device is in the correct state. In some embodiments, the security server computer may check the state information in the dynamic device profile in response to a request initiated by using the user device in a transaction (step 408).

The security server allows the transaction using the user device when the state information indicates the trusted state (step 410). The security server limits the transaction using the user device when the state information indicates the suspended state (step 412). The security server prevents the transaction using the user device when the state information indicates the untrusted state (step 414).

FIG. 5 illustrates an example flow diagram 500 for creating and managing a dynamic device profile according to an exemplary embodiment.

At step 502, a dynamic device profile may be created by the security server. The dynamic device profile may include device state information, identification information of the user device, behavioral history of the user device, a risk score assigned to the user device and other related information. The dynamic device profile may be updated with time as the consumer uses the user device to conduct transactions. Thus, the dynamic profile may reflect more accurately the expected behavior of the consumer using the user device for conducting transactions as more transactions take place with time. The device state information may indicate a trusted state, a suspended state and an untrusted state for the user device. The dynamic device profile may be maintained on the user device or a dynamic device profile database accessible by the security server computer when the device state information indicates the trusted state or the suspended state. When the device state information indicates the untrusted state, the dynamic device profile may be deleted and re-created upon the user device passing one or more security tests or when the user device is determined to conform with a pre-determined security criteria.

At step 504, the security server computer may determine that the user device is in the trusted state. The security server computer may perform a list of actions one by one (i.e. sequentially) to ensure that the user device is in a correct state (step 506). A subsequent action on the list may be performed if a current action is completed. The list of actions may include authentication of the user, verification of the user device security, identification of user device, creation of the dynamic device profile, binding of the user profile to dynamic device profile and management of the user device state and profile.

Depending on the outcome of these actions, the user device may be kept in the trusted state, transitioned to the untrusted state or transitioned to the suspended state. Specifically, at step 508, the user device is transitioned to the suspended state if a pre-determined event occurs (e.g., the circumstances surrounding use of the user device are somewhat suspicious, but not completely untrusted) and a first set of actions of the list is completed. For example, the predetermined event may be that a suspicious circumstance is present or inferred from the current or past transaction, but the circumstance is not so suspicious that the user device is transitioned to the untrusted state. For example, the first set of actions may include the verification of the user device security, the identification of user device and the management of the user device state and profile. The transition from the trusted state to the suspended state is illustrated as transition D 318 in FIG. 3 and the list of actions for transition D 318 are illustrated in Table 1 above. As provided above, the security server computer may allow limited transactions when the state information indicates the suspended state. This is advantageous, since the ability to use the user device to conduct a transaction is modified or limited based upon the possible risk of fraud.

At step 510, the user device is transitioned to the untrusted state if a predetermined event occurs (e.g., the user device is reported as lost or stolen) and a second set of actions of the list is completed. For example, the second set of actions may include the management of the user device state and profile. The transition from the trusted state to the untrusted state is illustrated as transition C 312 in FIG. 3 and the list of actions for transition C 312 are illustrated in Table 1 above. As provided above, transition C 312 may happen when the user device is lost, stolen or compromised (e.g. infected with malware). The "management of the user device state and profile" action may cause the user device profile to be updated to indicate that the device is lost, stolen or compromised and that the state information is to be updated to "untrusted." The security server computer prevents the user device in the untrusted state from conducting any transactions. The security server computer unbinds the dynamic device profile from the user profile to establish the lack of trust now associated with the user device.

At step 512, the user device is kept in the trusted state if a third set of actions of the list is completed. For example, third set of actions may include the verification of the user device security, the identification of user device and the management of the user device state and profile. The transition from the trusted state back to the trusted state is illustrated as transition E 314 in FIG. 3 and the list of actions for transition E 314 are illustrated in Table 1 above. Transition E 314 may not require re-authentication of the user to avoid consumer friction. As provided above, in the trusted state, the user device may be registered with the security server computer, identified by the security server computer and/or assessed to be trustworthy. The security server computer may notify the payment processing network that the user device is in the trusted state. The payment processing network may allow the user device to conduct transactions while the user device is in the trusted state.

Figure 6:
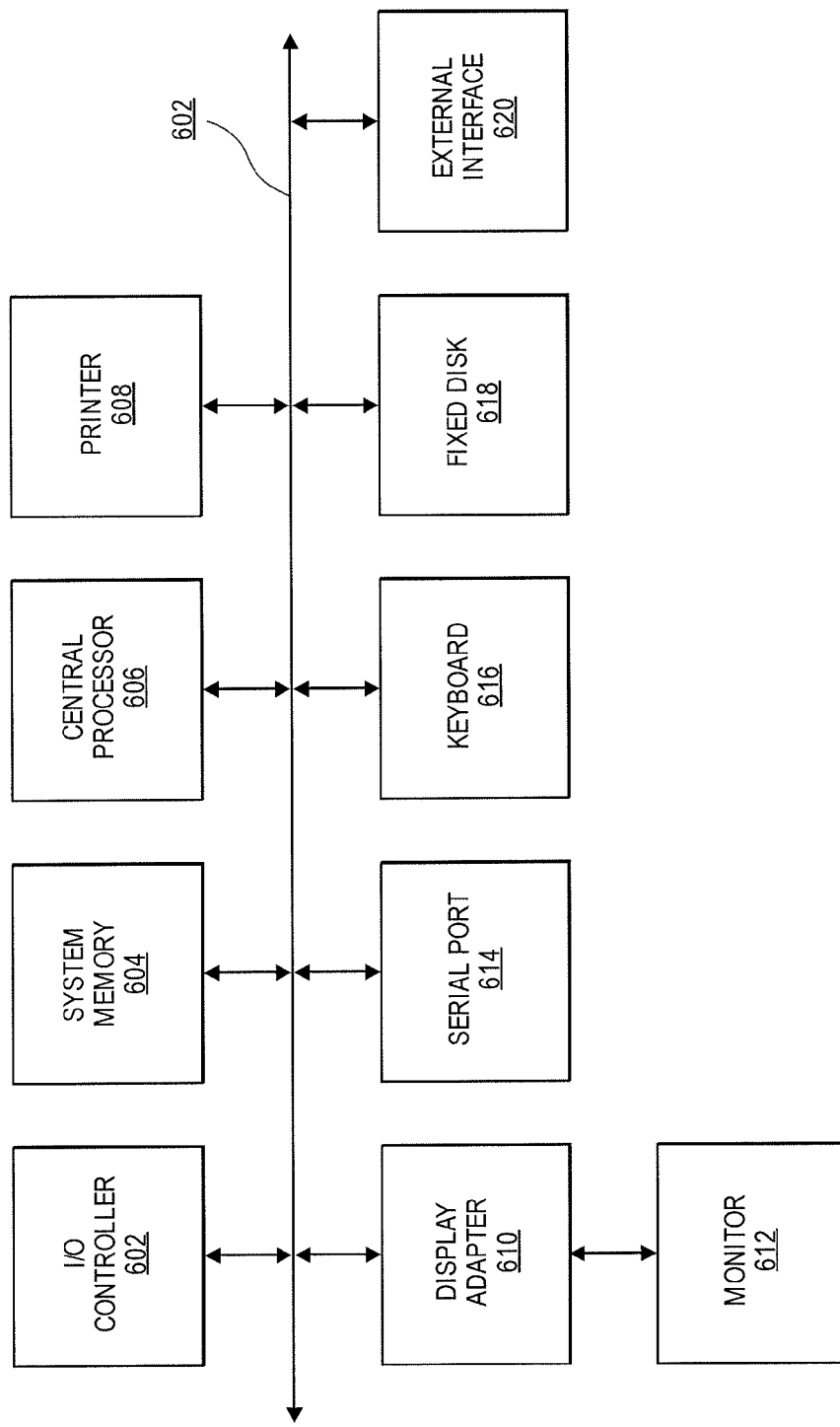
FIG. 6 is a high level block diagram of a computer system that may be used to implement any of the entities or components described herein.

FIG. 6 is a high level block diagram of a computer system that may be used to implement any of the entities or components described herein. The subsystems shown in FIG. 6 are interconnected via a system bus 602. Additional subsystems include a printer 610, keyboard 618, fixed disk 620, and monitor 612, which is coupled to display adapter 614. Peripherals and input/output (I/O) devices, which couple to I/O controller 604, can be connected to the computer system by any number of means known in the art, such as a serial port. For example, serial port 616 or external interface 622 can be used to connect the computer apparatus to a wide area network such as the Internet, a mouse input device, or a scanner. The interconnection via system bus 602 allows the central processor 608 to communicate with each subsystem and to control the execution of instructions from system memory 606 or the fixed disk 620, as well as the exchange of information between subsystems. The system memory 606 and/or the fixed disk may embody a computer-readable medium.

Figure 7:
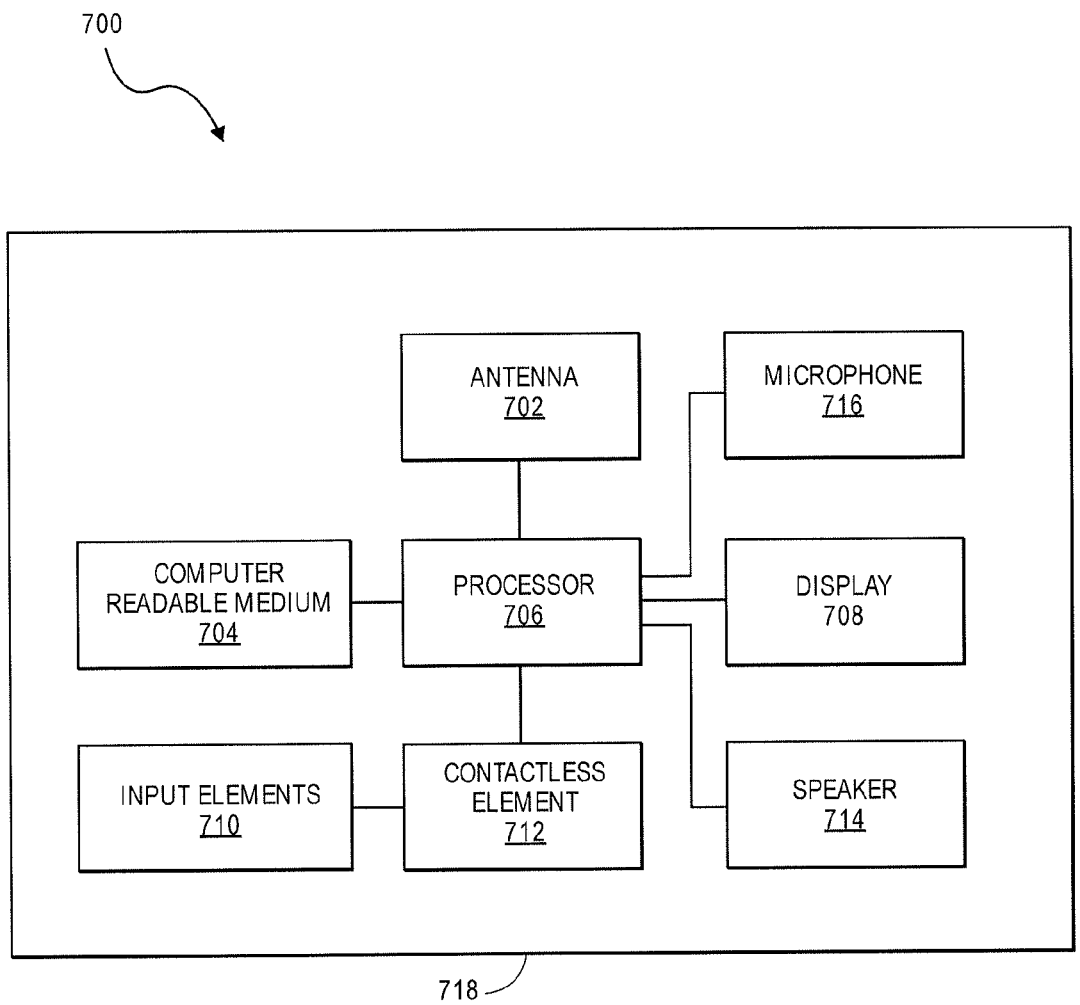
FIG. 7 is a high level block diagram of a mobile device that may be used to implement embodiments of the present application.

With reference to FIG. 7, a block diagram of an exemplary user device (e.g. mobile device 700) is shown that may be used in some embodiments. In some embodiments, the mobile device 700 may be a notification device that can receive alert messages, a payment device that can be used to make payments, an access device (e.g. POS device) that may receive information from a consumer to conduct a transaction, and/or a multi-purpose general use device. The exemplary mobile device 700 may comprise a computer readable medium 704 that be present within the body (or outer casing) 718, or the computer readable medium 704 could be detachable from the device (e.g. the computer readable medium 704 could comprise an external memory that could be connected through a physical interface such as a Universal Serial Bus (USB) connection, or the data could be hosted remotely and accessed wirelessly by the device—e.g. the data could be hosted and stored at a remoter server in the "cloud"). The computer readable medium 704 may be in the form of a memory that stores data. The memory may store information such as financial information, transit information (e.g., as in a subway or train pass), access information (e.g., access badges), serial numbers, mobile account information, and any other suitable information. In general, any of this information may be transmitted by the mobile device 700 (such as to an access device 160), via any suitable method, including the use of antenna 702 or contactless element 712. The body 718 may be in the form a plastic substrate, housing, or other structure.

In some embodiments, the mobile device 700 may further include a contactless element 712, which is typically implemented in the form of a semiconductor chip (or other data storage element) with an associated wireless transfer (e.g., data transmission) element, such as an antenna 702. Contactless element 712 may be coupled to (e.g., embedded within) the mobile device 700 and data or control instructions that are transmitted via a cellular network may be applied to the contactless element 712 by means of a contactless element interface (not shown). The contactless element interface functions to permit the exchange of data and/or control instructions between the mobile device circuitry and an optional contactless element 712, or between another device having a contactless element (e.g. a POS terminal or a payment device). Contactless element 712 may be capable of transferring and receiving data using a short range wireless communication capability. As noted above, mobile device 700 may comprise components to both be the interrogator device (e.g. receiving data) and the interrogated device (e.g. sending data). Thus, the mobile device 700 may be capable of communicating and transferring data or control instructions via both cellular network (or any other suitable wireless network—e.g. the Internet or other data network) and short range communications.

The mobile device 700 may also include a processor 706 (e.g., a microprocessor) for processing the functions of the mobile device 700 and a display 708 to allow a consumer to see phone numbers and other information and messages. The mobile device 700 may further include input elements 710 to allow a user to input information into the device, a speaker 714 to allow the user to hear voice communication, music, etc., and a microphone 716 to allow the user to transmit her voice through the mobile device 700. The mobile device 700 may also include an antenna 702 for wireless data transfer (e.g., data transmission).

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
creating, by a processor, a user profile;
determining, by the processor, state information for a user device based on authentication process used to authenticate the user device, wherein the state information indicates whether the user device has one of a trusted state, a suspended state and an untrusted state;

creating, by the processor, a dynamic device profile associated with the user device, the dynamic device profile including the state information for the user device;

binding, by the processor, the user profile to the dynamic device profile, wherein the binding prepares the user device to conduct one or more transactions;

in response to a request to perform a transaction with the user device, checking, by the processor, the state information in the dynamic device profile;

preventing, by the processor, the transaction with the user device when the state information indicates the untrusted state;

unbinding, by the processor, the user profile from the dynamic device profile when the state information indicates the untrusted state, wherein the unbinding revokes authorization to conduct the one or more transactions using the user device;

wherein the user device transitions among the trusted state, the suspended state and the untrusted state when a predetermined set of actions associated with each respective transition are completed, wherein a first subset of actions are associated with a transition from the trusted state to the suspended state and a second subset of actions are associated with a transition from the untrusted state to the trusted state;

continuously performing the second subset of actions to determine whether the user device qualifies to transition to the trusted state; and re-binding, by the processor, the user profile to the dynamic device profile when the second subset of actions are successfully completed, wherein the re-binding the user profile to the dynamic device profile transitions the user device from the untrusted state to the trusted state and reinstates the authorization to conduct the one or more transactions with the user device.

2. The method of claim 1, further comprising:
performing one or more security tests on the user device, wherein the predetermined set of actions include the one or more security tests; and
modifying the state information based on the one or more security tests.

3. The method of claim 1, further comprising:
associating a warning flag with the dynamic device profile when the state information indicates the suspended state.

4. The method of claim 1, wherein, when the user device is in the trusted state, the user device remains in the trusted state when a set of trusted state actions are completed.

5. The method of claim 4, further comprising:
continuously performing the set of trusted state actions to ensure that the user device qualifies to remain in the trusted state.

6. The method of claim 1, wherein, when the user device is in the untrusted state, the user device remains in the untrusted state when a set of untrusted state actions are completed.

7. The method of claim 6, further comprising:
continuously performing the set of untrusted state actions to ensure that the user device qualifies to remain in the untrusted state.

8. The method of claim 1, wherein the dynamic device profile further includes one or more of device identification information, device behavioral history, a risk score associated with the user device, a software configuration of the user device and a hardware configuration of the user device.

9. The method of claim 1, wherein the predetermined set of actions include one or more of authentication of user, verification of user device security, identification of user device, creation of the dynamic device profile, binding of the dynamic device profile to the user profile, and management of user device state and the dynamic device profile.

10. A method comprising:
determining, by a processor, state information for a user device based on authentication process used to authenticate a user device, wherein the state information indicates whether the user device has one of a trusted state, a suspended state and an untrusted state;

creating, by the processor, a dynamic device profile including the state information for the user device;

determining that the user device is in the trusted state, wherein the user device is authorized to conduct one or more transactions while in the trusted state;

continuously performing, by the processor, actions on a list of actions one by one, wherein an action on the list is performed if a current action is completed;

transitioning, by the processor, the user device to the suspended state if a first subset of actions of the list is completed, wherein the first subset of actions are associated with a transition from the trusted state to the suspended state, wherein transitioning into the suspended state restricts the one or more transactions conducted with the user device based on a predetermined criteria;

transitioning, by the processor, the user device to the untrusted state if a second subset of actions of the list is completed, wherein the second subset of actions are associated with a transition from the trusted state to the untrusted state, wherein transitioning into the untrusted state revokes authorization to conduct the one or more transactions using the user device; and keeping the user device in the trusted state if a third subset of actions of the list is completed.

11. The method of claim 10, wherein the list of actions include one or more of authentication of user, verification of user device security, identification of user device, creation of the dynamic device profile, creation of a user profile, binding of the dynamic device profile to the user profile, and management of user device state and the dynamic device profile.

12. A server computer comprising:
a processor; and
a computer readable medium coupled to the processor, the computer readable medium comprising code, executable by the processor, to implement a method comprising:

creating a user profile;

determining state information for a user device based on authentication process used to authenticate the user device, wherein the state information indicates whether the user device has one of a trusted state, a suspended state and an untrusted state;

creating a dynamic device profile associated with the user device, the dynamic device profile including the state information for the user device;

binding the user profile to the dynamic device profile, wherein the binding prepares the user device to conduct one or more transactions;

in response to a request to perform a transaction with the user device, checking the state information in the dynamic device profile;

preventing the transaction with the user device when the state information indicates the untrusted state;

unbinding the user profile from the dynamic device profile when the state information indicates the untrusted state, wherein the unbinding revokes authorization to conduct the one or more transactions using the user device;

wherein the user device transitions among the trusted state, the suspended state and the untrusted state when a predetermined set of actions associated with each respective transition are completed, wherein a first subset of actions are associated with a transition from the trusted state to the suspended state and a second subset of actions are associated with a transition from the untrusted state to the trusted state;

continuously performing the second subset of actions to determine whether the user device qualifies to transition to the trusted state; and re-binding the user profile to the dynamic device profile when the second subset of actions are successfully completed, wherein the re-binding the user profile to the dynamic device profile transitions the user device from the untrusted state to the trusted state and reinstates the authorization to conduct the one or more transactions with the user device.

13. The server computer of claim 12, wherein the method further comprises:

associating a warning flag with the dynamic device profile when the state information indicates the suspended state.

14. The server computer of claim 12, wherein, when the user device is in the trusted state, the user device remains in the trusted state when a set of trusted state actions are completed, wherein the method further comprises:

continuously performing the set of trusted state actions to ensure that the user device qualifies to remain in the trusted state.

15. The server computer of claim 12, wherein, when the user device is in the untrusted state, the user device remains in the untrusted state when a set of untrusted state actions are completed, wherein the method further comprises:

continuously performing the set of untrusted state actions to ensure that the user device qualifies to remain in the untrusted state.

16. The server computer of claim 12, wherein the dynamic device profile further includes one or more of device identification information, device behavioral history, a risk score associated with the user device, a software configuration of the user device and a hardware configuration of the user device.

17. The server computer of claim 12, wherein the predetermined set of actions include one or more of authentication of user, verification of user device security, identification of user device, creation of the dynamic device profile, binding of the dynamic device profile to the user profile, and management of user device state and the dynamic device profile.

18. The method of claim 1, further comprising:

allowing, by the processor, the transaction with the user device when the state information indicates the trusted state.

19. The method of claim 1, further comprising:

limiting, by the processor, the transaction with the user device when the state information indicates the suspended state.

20. The method of claim 1, further comprising:

determining that the first subset of actions occurred in connection with the user device;

updating, by the processor, the state information in the dynamic device profile of the user device from the trusted state to the suspended state.

21. The method of claim 20, further comprising:

restricting, by the processor, the transaction with the user device based on a predetermined criteria when the state information indicates the suspended state;

performing, by the processor, a security test with the user device upon determining that the state information indicates the suspended state;

updating, by the processor, the state information in the dynamic device profile of the user device to the trusted state if the security test is successful; and updating, by the processor, the state information in the dynamic device profile of the user device to the untrusted state if the security test is unsuccessful.

* * * * *